Dec. 14, 1965     L. G. MILLER ETAL     3,223,078

WARM AIR FURNACE

Filed Aug. 5, 1963     2 Sheets-Sheet 1

INVENTORS
JAMES H. MILLER
BY LORIN G. MILLER

ATTORNEYS

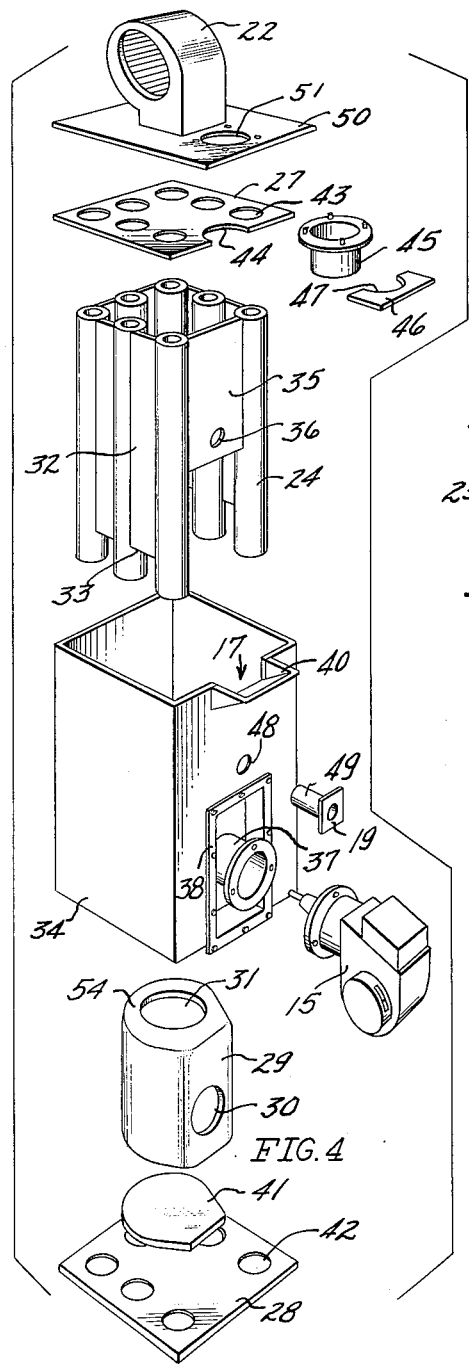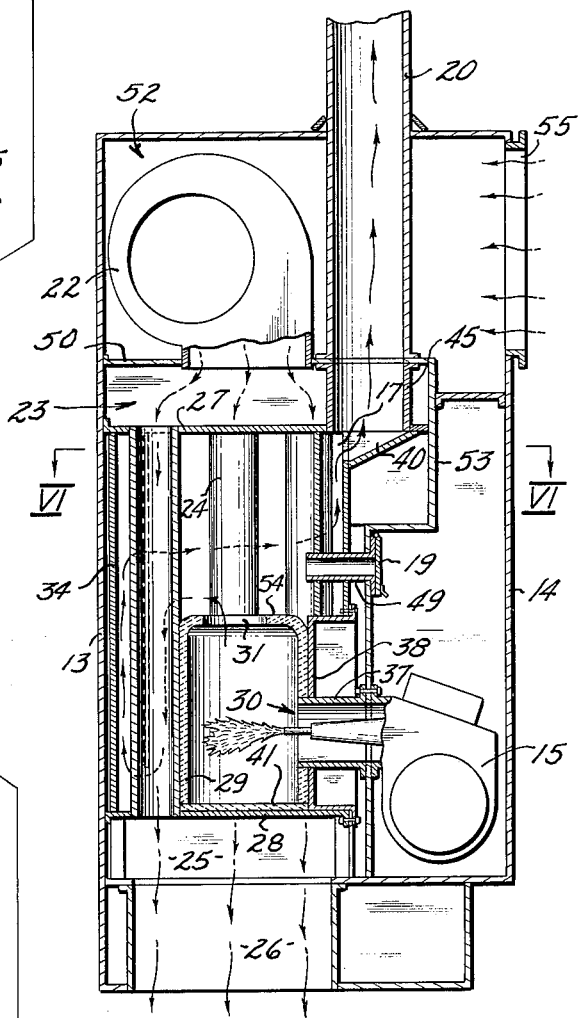
FIG. 4
FIG. 5
INVENTORS
JAMES H. MILLER
LORIN G. MILLER
BY
Miller Morris & Pappas
ATTORNEYS 3,223,078
WARM AIR FURNACE
Lorin G. Miller and James H. Miller, both of
220 South River, Eaton Rapids, Mich.
Filed Aug. 5, 1963, Ser. No. 299,990
2 Claims. (Cl. 126—110)

The present invention, which is a continuation-in-part of our copending invention set out in application entitled Warm Air Furnace, Serial Number 125,690, filed on July 21, 1961, now abandoned, relates to a furnace and more particularly to an improved furnace of the warm or hot air type which presents new performance in compactness, economy, comfort, and safety, and which is particularly adapted to tight installation as in mobile homes, closet installations as in slab floor houses, and in other compact dwelling and working space. By reason of substantially complete combustion of organic fuel the structure of the present invention has been utilized as a combination heater and carbon dioxide generator in greenhouse applications.

In hot air furnaces, which must be installed adjacent to and in contact with flammable panelling and the like, the heat from radiation from the furnace walls creates a dangerous fire hazard and hence, is unsuitable unless extreme care is exercised in installation to provide good insulation. The result has been the development of bulky heater units where large air gaps or insulation space is required to assure that safety requirements are met. Even with such precautions, persons familiar with conventional hot air heaters are well aware of the sensation of heat near the furnace and cold away from the furnace. This is because of heat loss at the furnace walls indicating inefficient handling of the heat in and through associated exchangers and ducting. The present invention wholly avoids overheating of the furnace outer walls and in addition, provides about an eighty-five percent efficiency of heat exchange while rendering the physical structure of the furnace extremely compact. In contrast to prior furnaces, the structural approach here taken to provide high efficiency, results in the desired compactness and comfort with attendant safety and economy. The heat experienced from the use of the presently described structure is very uniform and easily amenable to simplified thermostatic control since the locale of the furnace and the elimination of heat directly emanating from the furnace walls does not upset desired uniformity of heat distribution and balance. These results are accomplished by a simplified fire box so that the combustion heat tortuously flows by the exchange surfaces and so that the flame is shielded from direct exchanger contact and even from radiation contact with the outwardly facing exchanger surfaces. This arrangement extends the life of the tubular exchanger surfaces and a unique mantle liner in the flame chamber accomplishes unusual results in evening heat distribution to both primary and secondary exchanger surfaces. Collaterally, the baffle mantle, as will be seen, assists in providing an extremely efficient combustion. Extended testing under severe operating conditions has indicated minimal exchange surface damage as compared to that experienced in many burner units where flame is thrown into direct contact with exchanger surfaces. By reason of substantially complete combustion no residue or soot contaminates the furnace or exchangers. This unusual structure has likewise resulted in minimization of fabricating costs since no special metals are required to resist burning. Forced air flow through the exchanger tubes is easily adjusted volumetrically by conventional control means so that flowing air at no point exceeds a maximum set temperature.

The hot air furnace of the present invention is readily convertible from oil to gas, either natural or bottled, and its efficiency is independent of the fuel employed. Conditions maintained within the furnace are positive pressure conditions rendering stack height and negative pressure conditions from the stack less critical and resulting in a superior utilization of fuel.

In accord with the foregoing, the principal object of the present invention is to provide an improved furnace wherein the furnace walls cannot overheat even though they are closely adjoining the exchange surfaces.

Another object is to provide a much improved fire chamber and exchange surface arrangement within the furnace in shielding the furnace outer surfaces from direct flame or radiation contact.

Another object of the present invention is to provide a furnace operating with a positive pressure in the flame chamber thereby making the unit independent of stack height and avoiding negative pressure problems such as down draft and the like.

Another object is to provide a structure utilizing plural volumetric chokes or constrictions assuring positive pressure conditions in the combustion chamber and enhancing good heat exchange.

Still another object is to provide a highly efficient and compact furnace unit for mobile homes and the like which is prepackaged for economical installation.

Another object is to teach the use of a chemi-lumines cent mantle-like fire chamber in which combustion is upgraded so that a minimum of fuel residue appears in the exhaust.

Still another object is the provision of a completely prepackaged heat unit wherein burner, combustion chamber, heat exchanger, stack and blower are uniquely mounted to provide compactness and efficiency.

Other objects including improved comfort, safety, and economical performance will be more readily appreciated as the description proceeds.

GENERAL DESCRIPTION

In general, a cluster of vertical tubular heat exchange members surround a flame chamber. The tubular members serve as heat exchanger surfaces with air to be heated passing through them. The exchanger tubes are in spaced apart adjacent relationship and are in adjacent abutting relation to a baffle mantle which extends between each of the tubes and faces inwardly toward the flame chamber. This lower and inner baffle mantle extends vertically about one-half the length of the exchanger tubes. The outer baffle commences at the top of the tubes and girdles the tube cluster toward the outside of the tubes in generally concentric spaced apart relationship from the lower baffle mantle. The lower baffle mantle comprises an inorganic fibrous insulating material which glows upon application of heat but which is not dependent upon organic binders so that it serves as an interrupter barrier in preventing flame contact with the tubes and outer baffle plate as flame is injected into the flame chamber. In fact, the baffle mantle glows with a chemi-luminosity suffusing the interior of the furnace with a radiant form of energy and exposing all primary exchange surfaces within sight of the baffle mantle. The baffles are arranged to provide a connected gap between a pair of tubes and the flame gun is inserted between selected of the tubes and is aimed to deliver flame to the flame chamber portion defined by the lower baffle mantle. The inner sides of the tube surfaces serve as primary exchange surfaces and absorb radiant heat from the glowing mantle liner and from the rising combustion gases. The rising column of combustion gases is reversed in flow direction by contact with the upper tube support and plenum chamber floor and by the upper and outer baffle so that the gases are then passed downwardly between the tubes and then upwardly to the backs of the tubes serving as secondary exchange surfaces and then in upward swirling movement to exhaust. Hence, the path of the combustion gases approximates an S form originating in the combustion mantle and tortuously moving to exhaust.

Several volumetric chokes are seen in the present invention commencing with the flanged upper edge of the mantle element, the constriction of gases in motion around and under the outer baffle skirt exchanger tubes, and finally the constriction at the exhaust opening.

The air to be heated is forced through an upper manifold or plenum down the exchanger tubes, out through a lower manifold and thence to suitable ducting, as for example, between floor joists or the like to room registers, for example. A generally concentric sheath surrounds and is spaced from the tube cluster having a longitudinal partial opening accommodating the flame gun and an opening communicating with the exhaust stack. A ceramic plug aligning the gun may be provided with a pair of access openings therethrough, a lower gun port and an upper inspection port. Thus, a tubular wall is placed about the tube cluster and horizontal tube supports provide a ceiling and floor closing the furnace while providing vertical communication for warmed air with provisions for separate exhaust of combustion gases.

An outer sheet metal surface or furnace jacket is closely fitted to the wall and provides suitable and decorative mounting means for the flame gun, the stack ducting and automatic controls. No insulation as between exchange tubes and walls or jacket is required since by reason of the baffling no direct contact with flame or radiation occurs. This greatly minimizes space requirements and is possible because of the efficient heat exchange. Combustion is sustained by oxygen drawn from the air coming into the furnace at floor level and the gun is shielded by a gun tube and by a ceramic plug or block if desired. Exhaust gases exit above the flame gun and on a level approximating the floor of the plenum or fresh air manifold. In operation, a room thermostat (remote from the furnace) signals the requirement for heat and the burner gun is ignited. For example, when the blower compartment achieves a set heat, indicating temperature of return air, controls shut off the gun and start the blower operating. This lowers the temperature at the blower and the gun reignites. This, then allows the blower to be controlled by a lower blower thermostat. The room thermostat, when satisfied, shuts off the gun but the blower continues in operation until dissipation of heat from the exchanger. The blower control is adjustable to maintain proper delivery temperature in the heated air. From a safety point of view the burner may be shut off whenever the blower compartment achieves or exceeds a set temperature and the lower limit switch will break the circuit to the gun if temperatures at that point achieve or exceed a set temperature. A further monitoring control may be used to prevent energization of the burner or gun circuit upon any failure of ignition. While the controls form no part of the present invention, the general circuitry, well known in the art, is described in a general manner to indicate the simplicity and adaptability of the present invention to fully automated control with safety interlocks.

During the flame period, the flame chamber is maintained at a positive pressure by volumetric flow adjustment as between flame chamber, secondary heat chamber, and stack entry. This may be viewed as sequential orificial constriction.

As the description proceeds it will be appreciated that high efficiency exchange is accomplished and when properly controlled no condition in excess of a set condition can occur in the blower compartment or warm air origin point.

In the drawing:

FIGURE 4 is an exploded view of a furnace in accord with the present invention and indicating the principal construction elements and their interrelationship.

FIGURE 5 is a full cross section elevation view taken through the structure as shown in FIGURE 1 and with flow arrows to indicate the direction of movement of air and combustion gases.

SPECIFIC DESCRIPTION

Figure 1:
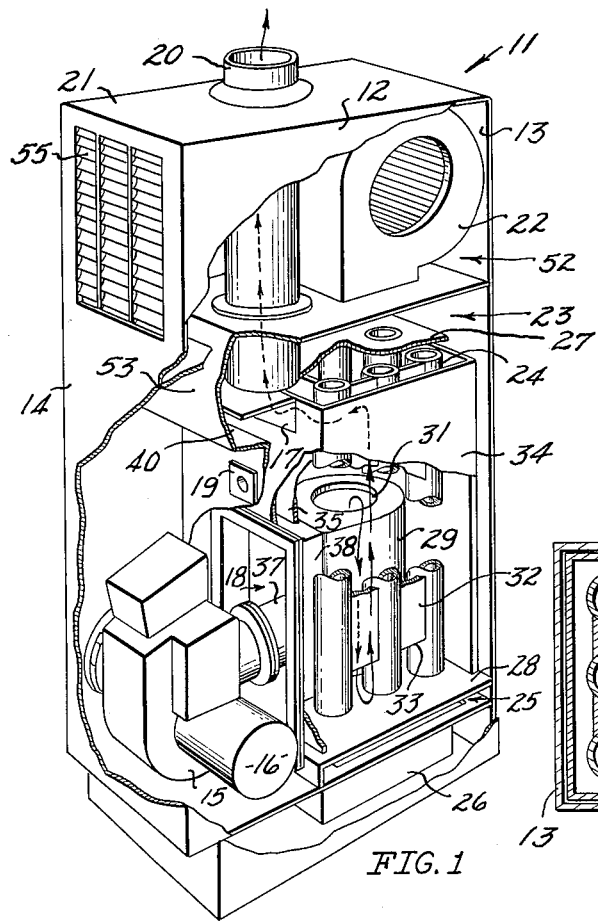
FIGURE 1 is a perspective view of the furnace of the present invention and indicating its compact finish arrangement and indicating in partial broken line the installation of stack, burner gun, mantle baffle and fire box, exchanger and path of combustion gases.

Referring to the drawing and specifically to FIGURE 1, it will be seen that the unit described is extremely compact, the furnace 11 being rectangular in cross section and having flush side walls 12 and back 13. This allows the furnace unit 11 to be directly mounted in a closet or alcove flush against adjacent walls. The face cover 14 is removable and encloses the complete mechanical portion of the structure including flame gun or burner 15, drive 16, jog provisions for stack entry 17, gun port 18 and visual access opening cover 19. A control panel, not shown is also conveniently positionable within the face cover 14. The exhaust stack 20 extends from the upper front portion of the furnace 11 and through the cover 21. The cover 21 encloses a blower 22 and plenum or air manifold 23 delivering air to be heated downwardly through the exchanger tubes 24 as will be seen. A plurality of the exchanger tubes 24 are arranged in a tube cluster and communicate at the top with the plenum or entry manifold 23 and at the bottom with a delivery chamber or exit manifold 25 connected to warm air delivery conduit 26. Upper closure plate 27 orients the tubes 24 as does floor plate 28 and the plates 27 and 28 thus define the upper and lower bounds of the heating portion of the furnace 11.

The tubes 24 are clustered concentrically about a flame chamber which comprises a mantle baffle 29. Accordingly, the mantle baffle 29 rests on the floor plate 28 and extends upwardly for about one-half the length of the tubes 24 clustered thereabout. The mantle baffle 29 serves to screen direct flame contact from the tubes 24 and, as will be seen, emits a chemi-luminescent radiance when fired. The mantle baffle 29 is accordingly provided with a side entry gun port 30 (see FIGURE 5) and a flanged upper opening 31 which provides an orificial first choke on expanding gases.

An outer tube connecting baffle 32 intermediate each of the tubes 24 extends downwardly from the plate 27 to within a relatively short distance upward from the floor plate 28. The gap between the lower edge 33 of the baffle 32 and the floor plate 28 provides an additional flow constriction to exhaust gases and serves to separate the tubes 24 into primary (inner) exchange surfaces and secondary (outer) exchange surfaces. The primary (inner) surfaces of the tubes 24 are exposed to the chemi-luminescent glow from the baffle mantle 29. The secondary (outer) surface of the tubes 24 are primarily exposed to the partially stripped gases moving upwardly. An outer encasement 34 surround the tubes 24 and is spaced outwardly therefrom providing an outer upward passage for exhaust gases until they exhaust through the stack entry 17 in a final volumetric constriction.

Figure 2:
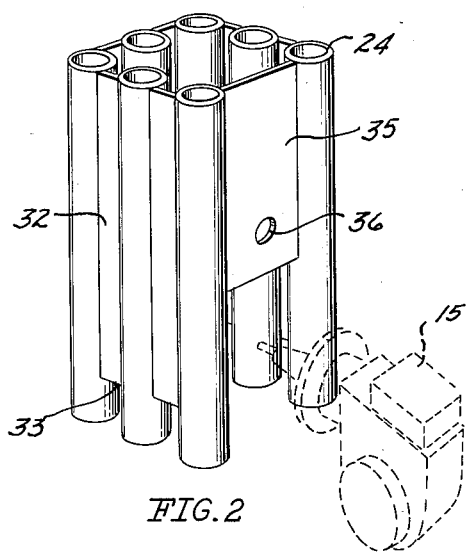
FIGURE 2 is a perspective view of a group of exchanger tubes and showing the upper baffles in position and indicating the burner or gun position in phantom line.

The general arrangement of tubes 24 is best appreciated by reference to FIGURE 2 where a rectangular cluster of the tubes 24 is shown. The outer baffles 32 are shown spacing each of the tubes from the next adjacent tube. The outer baffles 32 extend from the tops of the tubes 24 downwardly and the lower edge 33 of the outer baffles 32 stops short of the lower ends of the tubes 24. As will be noted, one side of the cluster of tubes 24 is spaced apart by the front plate 35 which, like the baffles 32, extends downwardly from the upper edge of the tubes 24 but terminates slightly below the middle length of the tubes 24 so as to provide access for the flame gun 15 (phantom line). The front plate 35 includes an opening 36 for the visual inspection port 19.

When the gun 15 is finally positioned it is secured in aligned relation by gun tube 37 positioned by gun aperture plate 38 which closes the opening 39 shown in the FIGURE 2. In some instances, it is desirable to utilize a ceramic plug as a centering structure for the nozzle of the gun 15. The outer encasement 34 is provided with the stack entry 17 so that exhaust gases pass from the interior of the structure and upwardly into the exhaust chamber 40 and into the stack 20 as they are trapped between the upper closure plate 27, the outer baffles 32, connected tubes 24, and interior walls of encasement 34. It will be thus appreciated that combustion gases pass from the baffle mantle upwardly and are then forced downwardly by the upper closure plate 27 and baffles 32 in peripheral contact with the inner (primary) exchange surfaces of the tubes 24. Then the combustion gases rise in contact with the outer (secondary) exchange portions of the tubes 24 and swirl toward the stack entry 17 moving between the outer baffles 32 and outer encasement 34 and passing between the front plate 35 and outer encasement 34. The combustion gases are thus seen to describe an S-pattern of flow in the furnace 11 and direct flame contact with any surfaces is prevented by confinement of actual combustion within the mantle baffle 29. From the center of the structure in the baffle mantle 29 gases pass radially upward, then downwardly and radially under the skirt formed by the baffles 32, then upwardly and swirlingly to the front positioned stack entry 17.

Figure 3:
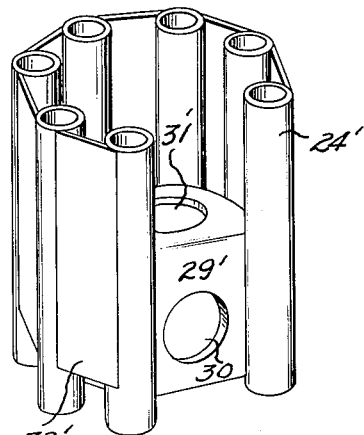
FIGURE 3 is a perspective view of a modified form of exchanger tube cluster with baffles in position.

As will be appreciated, a variety of forms of tube cluster as well as tubes may be utilized and in FIGURE 3 the tubes 24' are cylindrically arranged in spaced apart vertical grouping with outer baffles 32' extending from the upper edge of tubes 24' downwardly as previously described and clustered about an inner baffle mantle 29'. The front plate has been removed for clarity and the opening 39' through the tube cluster is appreciated and including the opening 30' in the baffle mantle 29' as access for the flame gun (not shown). No special metals need be used since corrosion is substantially avoided by reason of complete combustion in the baffle mantle 29 and 29' and the avoidance of direct metal contact with flame.

In the exploded view of FIGURE 4 the relationship of elements in the FIGURE 1 can be better appreciated. The tube cluster, comprising a plurality of upstanding tubes 24, as seen in FIGURE 2, provides the necessary exchange capacity and outer baffling support. The cluster of tubes 24 is positioned and grouped concentrically and in perimetric upright relationship about the inner baffle mantle 29 resting on a palette 41 closing the baffle mantle 29 at the bottom and resting on the floor plate 28.

The tubes 24 are secured as by swaging or welding in the openings 42 of the floor plate 28. The upper closure plate 27 provided with openings 42 in register with the tubes 24 is secured to the tubes 24 as in the instance of the floor plate 28. The upper closure plate 27 is also provided with a hemispheric cut-away front portion 44 for accommodation of the stack fitting 45. Mated with the stack plate 46, also provided with a hemispheric cutaway portion 47, this provides stack support spaced outwardly from the tube cluster and outwardly from the front plate 35. This assembly of vertical tubes 24 and outer baffles 32 secured between upper closure plate 27 and floor plate 28 and including baffle mantle 29 is enclosed in the outer encasement 34, the encasement 34 being spaced apart from contact with the tubes 24 and front plate 35. The stack entry opening 17 at the face of the structure is provided with a jog 40 closing against the upper closure plate 27 and stack plate 46 to provide a communicating passage from the interior to the stack 20 via the stack fitting 45. Gun tube 37 extending through aperture plate 38 provides mounting means for the flame gun 15 through the front face of the encasement 34. The tube 37 is in registry relation with the opening 30 in the baffle mantle 29. The visual port cover 19 and attached inspection tube 49 is insertable through the registry opening 48 provided through the encasement and above the baffle mantle 29. Thus, the opening 48 for the visual inspection cover 19 is in register with the corresponding opening 36 in the face plate 35. The inspection tube 49 is insertable through the openings 48 and 36 for observation of conditions in furnace 11.

Spaced above the upper closure plate 27 is a chamber top plate 50 having an opening 51 therethrough for accommodation of the stack fitting 45. The chamber top plate 50 also provides mounting support for the blower 22. The blower 22 in its air receiver compartment 52 forces air downward through the chamber top plate 50 and into the plenum chamber 23, through the tubes 24 and then to distributing chamber 25 at the bottom of the furnace structure. The vertical spacing between the chamber top plate 50 and the closure plate 27 is established by the height of the tubular portion of the fitting 45 and is otherwise bounded by the outer encasing furnace walls 12 and back 13 and across the front by a panel 53 shown in FIGURE 5.

Figure 6:
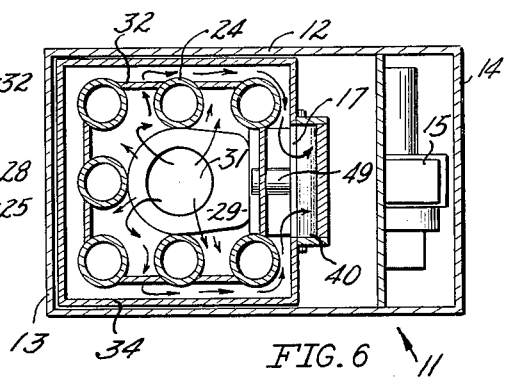
FIGURE 6 is a top elevation cross section taken on the line VI—VI of FIGURE 5.

By reference to FIGURE 5 the relationship of assembled elements can best be seen in a full cross section taken on a plane passed front to back through the center of the structure of FIGURE 1 where "front" as used herein has reference to the side of the device through which the flame gun 15 is passed. Combustion occurs wholly within the mantle baffle 29 and the mantle achieves a chemiluminescence at the commencement of combustion so that a glow of the mantle occurs throughout the material comprising the mantle and which contributes to high combustion efficiency and converts the heat within the structure to a radiant exposure of primary surfaces. The ignition of the incoming fuel is so instantaneous that no definite flame form is visible, yet the entire baffle mantle 29 produces high energy with no smoke, residue, or carbon monoxide assuming adequate oxygen fuel ratio at or above stoichiometric requirements for burner and furnace size. The exhaust gases pass upwardly through the opening 31 in the baffle mantle 29 and are constricted in flow by the flange 54 defining the orificial opening 31. Thereupon the combustion gases are permitted to expand volumetrically upward and outward until confinement by the upper closure plate 27 and the tube connected outer baffles 32. This forces the gases downwardly and around the outer case of the mantle baffle 29 in contact with the inner facing exposed surfaces of the tubes 24. Then the gases are again constricted by the gap formed between outer baffles 32 and the floor plate 28 whereupon the gases again expand and rise in exchange relation with the outer and secondary faces of the tube 24 and then pass forwardly and upwardly in the space between encasement 34 and baffles 32 to exhaust through the stack entry 17 and thence upward into the stack 20. By reference to FIGURE 1, incoming ambient air is admitted to the chamber 52 through the louvered entry 55 through the face cover 14 and is thereupon forced into the plenum chamber 23 by the action of the blower 22. Upon entry of ambient air to chamber 52, some preheat occurs as the incoming air courses around the stack 20 rising vertically through the chamber 52. The air in the plenum 23 is heated in passage against the upper closure plate 27 and in the tubes 24. Accordingly, that portion of the upper closure plate 27 exposed to the radiant heat source actually serves as a primary exchange surface. The balance of the closure plate 27 screened from the radiant heat source is a secondary exchange surface. The air to be warmed moves vertically downwardly through the tubes 24 to the distributing chamber 25 and thence through distributor ducts 26 to points of use remote from the furnace 11. In FIGURE 6 this relationship in best seen and indicating the baffle mantle 29 serving as a flame chamber and as a control baffle for expanding combustion gases with the flow of air passing downwardly through the tubes 24. The FIGURE 6 also best shows the passage of exhaust combustion gases through the stack entry 17 in a final constriction of the spent gases.

Figure 7:
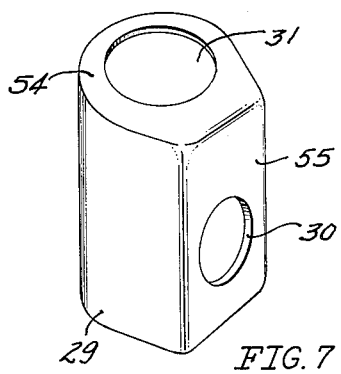
FIGURE 7 is a perspective view of a mantle baffle comprising the flame chamber of the present invention and indicating the flanged opening providing an orificial constriction to combustion gases.

In FIGURE 7 the baffle mantle 29 is illustrated in perspective and is seen to comprise a molded generally tubular body 56 having an upper flange 54 defining a top opening 31 therethrough and generally axially positioned with respect to the body 56.

A transverse opening 30, at right angles to the axis of the body 56 opens through the wall of the baffle mantle 29. As will be appreciated, this serves as an aperture for the flame gun 15 through the gun tube 37. The baffle mantle 29 thus contains all flame and glows with a chemi-luminescence conducive to complete combustion and places the heat energy in the most advantageous radiant form for efficient exchange. It is believed that injected fuel particles impinge on the porous inner walls of the baffle mantle 29 and are consumed in this position, the radiant heat in the mantle greatly assisting in the achievement of complete combustion. To achieve the desired chemi-luminescence, the baffle mantle 29 is molded from an inorganic fibrous refractory material having a substantial degree of fibrous porosity and held together with an inorganic binder. It may be backed by a metal sheath (not shown) or in thicker material may be free standing as illustrated. Where metal backing is used, the baffle mantle maintains its chemi-luminescence and prevents direct flame contact with the metal. The material comprising the baffle mantle is sold under the trade-name "Fiber Frax" and is resistant to heat destruction up to temperatures of 4200 degrees Fahrenheit. It is a product of the Carborundum Corporation and may be viewed as a refractory shield capable of suffusing heat in a radiant (light) form so as to provide a transmission of heat in a form ready for efficient transfer. In addition, the baffle mantle screens all primary surfaces from direct flame contact thereby extending the life of the furnace and avoiding oxidizing and corrosive destruction of the exchange surfaces.

Operation of the furnace of the present invention is quite unique in that the flame chamber defined by the baffle mantle 29 is maintained under a positive pressure resulting from three constrictions imposed upon the volumetric flow of exhaust gases. The first constriction occurs by reason of the flange 54 at the baffle mantle 29. The second constriction occurs as the outer baffle arrangement approaches closure with the floor plate 28. The final constriction occurs at the stack entry 17 and may be modified by additional constrictions in the stack 20 as desired. By operating under positive pressure, the furnace 11 in accord herewith delimits the criticality of stack draft and causes an environment which upgrades exchange efficiency. This pressure differential is of a magnitude of .0204 inch of water above an ambient atmosphere condition. This condition obtains with an innput of 14.4 cubic feet/minute to the flame chamber formed by the baffle mantle 29 and an exhaust through the flange constriction of 58.7 cubic feet/minute of expanded gases. Substantially all known furnace devices have heretofore been designed to employ a negative pressure in the flame chamber and are accordingly dependent upon highly critical stack conditions for most efficient operation. The device of the present invention uses the stack solely as a conduit for spent gases and does rely upon flow for the establishment of a furnace environment of negative pressure, or a pressure below ambient condition. The operation of the described structure is also characterized by a very slow rise in stack temperature requiring approximately 10 minutes for an elevation of 400 degrees. This is at substantial variance from existing structures most of which rely heavily upon an induced or forced draft rendering the stack highly critical. This slow rise in stack temperature is indicative of the highly efficient exchange or heat utilization. Substantial economies in operation are realizable with the described devices.

Tests of exhaust gases from furnaces in accord with the foregoing description show no carbon monoxide hence indicating a substantially complete combustion varying from 100 percent to the extent of included sulphur fractions varying largely with particular fuels utilized. Accordingly, devices in accord with the foregoing description have served as carbon dioxide generators operating without stack and favorably received in greenhouse operations where heat and high carbon dioxide is sought.

Oxygen for sustaining complete combustion is admitted at the gun 15 with fuel injected into the baffle mantle 29.

Closest known furnace devices are those of A. T. Lanphere in United States Letters Patent 173,173 and H. L. De Frees, United States Letters Patent 2,155,968. Both utilize tubular exchangers in a warm air furnace structure. Both are understood to rely heavily upon stack conditions for efficient operation and are accordingly viewed as negative pressure combustion structures. In United States Letters Patent 173,173 it is understood that the flow of air is upward through the tubular exchangers and the baffling arrangement indicated does not describe the characteristic S curve developed by the directed gases in the present invention. This is also true of the device of United States Letters Patent 2,155,968, insofar as gas flow direction is concerned, and additionally, the diagonal baffling is seen to impose only a U pattern to the combustion products. Neither of these known furnaces suggests a chemi-luminescent combustion chamber, itself providing a primary constriction or choke and serving as a radiant energy filament shielding direct flame from exposure to exchange surfaces.

Excellent exchange efficiencies are found in the described structures and the efficiency of combustion using the described baffle mantle 29 has substantially eliminated the production of carbon monoxide.

Having thus described our invention, it will be appreciated by those skilled in the art that various modifications and improvements may be included. Such modifications and improvements are intended to be included herein limited only by the scope of the hereinafter appended claims.

We claim:
1. A positive pressure warm air furnace structure comprising:
(a) a receiving chamber for air to be warmed defined by louvered walls, a cover, and a floor plate;
(b) a plenum chamber below and communicating with said receiving chamber defined by walls, a cover comprising the floor plate of said receiving chamber, and a bottom having openings therethrough;
(c) a blower positioned in said receiving chamber arranged to force air downward and into said plenum chamber;
(d) a plurality of vertical exchanger tubes in upper flow communication with said plenum chamber;
(e) a warm air distribution chamber beneath said tubes and into which said tubes are in flow communication defined by walls, a cover having openings therethrough in registry with said tubes, and duct connections;
(f) a baffle between each pair of said tubes and extending from said plenum chamber downwardly stopping short of said distributing chamber;

(g) an encasement in spaced concentric relation around all of said tubes and in closed contact at the top with said plenum chamber and at the bottom with said distributing chamber and defining openings therethrough for top exhaust and flame gun access; and (h) a fibrous refractory inorganic tubular flame chamber about which said tubes are clustered and having a constriction at the upper end thereof and resting on said air distributing chamber and glowing in an incandescent manner upon ignition of fuel therein.

2. In a positive pressure warm air furnace, the combination comprising:

(a) a flame gun;

(b) a flame chamber constructed of fibrous inorganic material having a base closure and generally tubular walls flanged inwardly to form a constricted opening at the top thereof and into which said flame gun is inserted;

(c) a plurality of vertical tubes in clustered contact with said flame chamber;

(d) a floor plate supporting said flame chamber and having openings therethrough peripherally closing on said tubes at their lower ends;

(e) an upper closure plate supporting said tubes at the upper ends thereof and peripherally closing on said tubes;

(f) a baffle element between adjacent of said tubes and secured to the walls of said tubes and extending from said upper closure plate toward said floor plate;

(g) a peripheral tubular outer encasement in spaced relation around said tubes closed at one end by said upper closure plate and at the other end by said floor plate and having an opening defined therethrough at the upper end for stack attachment and a cover opening defined therethrough for said flame gun;

(h) a stack in vertical registry with said upper opening in said encasement;

(i) an outer furnace case having framing for mounting said flame gun, supporting said stack and said floor and said closure plates and defining at the top of said case a fresh air inlet and at the bottom of said case a warmed air outlet; and (j) a blower in said fresh air inlet arranged to direct flow through said inlet downwardly through said tubes and to said outlet.

References Cited by the Examiner

UNITED STATES PATENTS

| | | | |
|---|---|---|---|
| 717,502 | 12/1902 | Jones | 126—109 |
| 2,942,600 | 6/1960 | Heiman | 126—110 |
| 3,100,734 | 8/1963 | Rex et al. | 110—86 X |

FOREIGN PATENTS 610,978   12/1960   Canada.

JAMES W. WESTHAVER, *Primary Examiner.*